Feb. 14, 1967    R. S. WILKES ET AL    3,303,917

MATERIAL CONVEYING AND DISTRIBUTING DEVICE

Filed Oct. 11, 1965

INVENTORS
R. S. WILKES, A. B. SKROMME

BY William A. Murray
ATTORNEY

United States Patent Office 3,303,917
Patented Feb. 14, 1967

3,303,917
MATERIAL CONVEYING AND
DISTRIBUTING DEVICE
Raymond S. Wilkes and Arnold B. Skromme, Moline,
Ill., assignors to Deere & Company, Moline, Ill., a
corporation of Delaware
Filed Oct. 11, 1965, Ser. No. 494,777
2 Claims. (Cl. 198—64)

This invention relates to a material conveying and distributing device of the bunk feeder type. Still more particularly this invention relates to a means for applying even distribution of material from a side of a bunk feeder auger conveyor.

In U.S. patent application Ser. No. 346,822, now Patent No. 3,270,857, that was filed February 24, 1964 there is shown and described a material conveyor or bunk feeder having an elongated auger housing with a slot opening to one side thereof and extending its full length. Adjacent the intake end of the auger housing is a material hopper that collects and feeds material to the intake end. An elongated auger extends into the hopper and the full length of the auger housing for purposes of augering ma-material from the hopper and through the auger housing. Between the auger housing and hopper there is provided a device adapted to twist or distort the auger housing so so that the slot is inclined downwardly between the intake end and the remote end of the auger housing. Material moving through the auger housing feeds over the lower edge of the slot in substantially equal amounts throughout the length of the auger housing.

It has been found in the above type of bunk feeder that the auger portion within the housing will often pick up or move material from the hopper at a rate that causes considerable discharge of material at the inner end of the auger housing until the material is reduced to a level closely equal to the height of the lower edge of the slot. Consequently material in this type of bunk feeder has in the past often accumulated adjacent the hopper whereas the material leaving the housing at a short distance from the hopper will tend to equalize or be evenly distributed.

With the above in mind it is the primary object of the present invention to provide a hopper, an auger housing, and an auger structure within the hopper and housing that does not permit a large accumulation of material to be delivered directly into the intake end of the auger housing. Specifically it is the object of the invention to lower the capacity of the auger portion with the hopper in order that the material moving into the auger housing will not pass at a level greater than the auger tubes can satisfactorily handle. Also, by use of such a structure the material will seldom plug after it leaves the hopper since the maximum capacity of the auger conveyor within the hopper is less than that within the auger tubes.

Other objects and advantages of the present invention will become apparent to those skilled in the art as the nature of the invention is better understood from the following description and as shown in the accompanying drawings.

Figure 1:
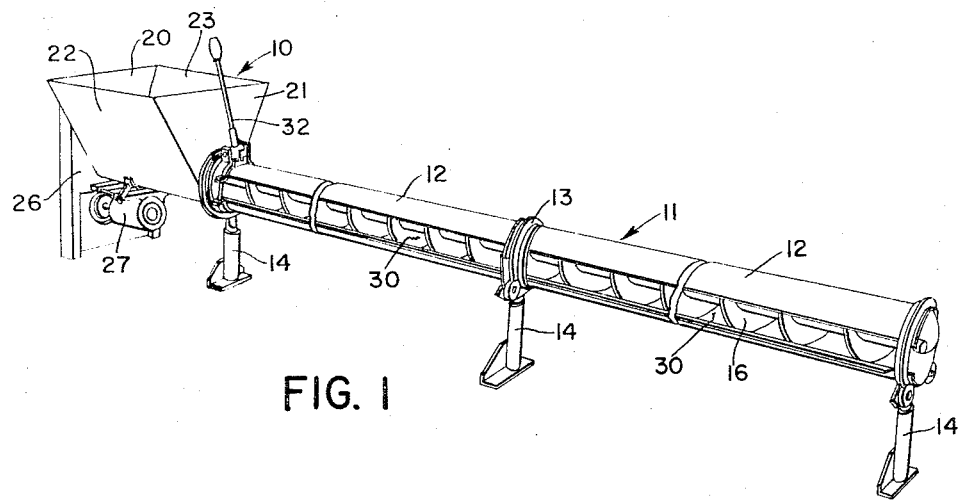
FIG. 1 is a side perspective view of a bunk feeder utilizing the principles of the present invention.

A bunk feeder is normally composed of a hopper 10 and an auger portion 11. The auger portion includes a series of longitudinally aligned housing sections 12 that have adjoining ends connected by suitable annular junctures 13. The entire auger housing is supported on longitudinally spaced supporting stands 14 that permit a degree of rotation of the auger housing about the housing axis. In the particular form of bunk feeder here shown, the outermost stand 14 has a locking device, not shown, that locks or prevents that end from rotating. Extending along the axis of the auger housing is an auger 16 with an extension 17 that projects into the hopper structure 10.

Besides the auger extension 17, the hopper 10 is normally composed of a pair of triangular-shaped end walls 20, 21 interjoined by longitudinally extending and converging side walls 22, 23. The lower end portions of the side walls 22, 23 are formed into an arcuate-shaped floor 24 that underlies the auger extension 17. The hopper 20–24 is supported adjacent the end panel 20 by an upright stand 26 that also carries a motor 27 which is the main power source for the entire auger structure.

Each of the auger housing sections 12 has an outwardly opening slot 30 that extends the full length of the respective section with the slots of successive tubes being aligned so as to form a continuous slot the entire length of the auger housing. As mentioned previously the outer end of the auger housing is fixed against rotation by the outermost stand 14. However, the inner material intake end is supported on the end wall 21 of the hopper for rotation and a lever and locking device 32 is provided to twist or distort the auger housing so as to incline the slots 30 and particularly the lower edge of the slots 30 from an upper end adjacent the hopper 10 to a lower end at the outer end of the entire auger assembly 11. By inclining the lower edge of the slot 30, material moving through the auger housings will be distributed evenly over the lower edges of the slots 30. Generally the detailed construction of the lever and locking device 32, the housings 12, and the supporting stands 14 is given in the aforementioned application Ser. No. 346,822, now Patent No. 3,270,857.

Figure 2:
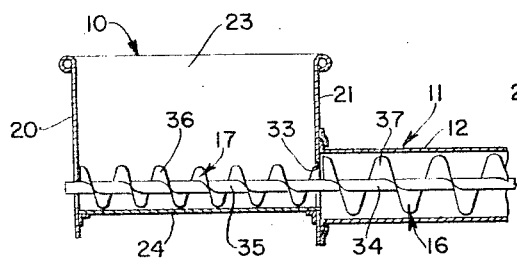
FIG. 2 is a vertical longitudinal sectional view through the hopper and the intake portion of the auger housing.

In the form of the invention shown in FIGS. 1 and 2, there is provided in the end wall 21 an opening 33 that is considerably smaller than the cross sectional dimension of the housing section 12. The auger 16 and auger extension 17 are provided with axially aligned core portions 34, 35 that are substantially the same size. Auger flighting 36 is carried on the core 35 and auger flighting 37 is carried on the core portion 34. As may be clearly seen from viewing FIG. 2, the diametrical dimension of the flighting 36 is considerably smaller than that of the flighting 37 and consequently the maximum capacity of the auger flighting 36 is considerably less than that of the flighting 37. Being smaller, the auger flighting 36 will not move or convey material at a rate greater than can be handled by the auger 16 as it enters into the inner end of the housing 12 or at a level considerably above the lower edge of the elongated slot 30. Consequently at the initial end of the housing section 12, and as the material leaves the hopper 10, large quantities of the material will not be discharged over the lower edge of the slot.

Figure 3:
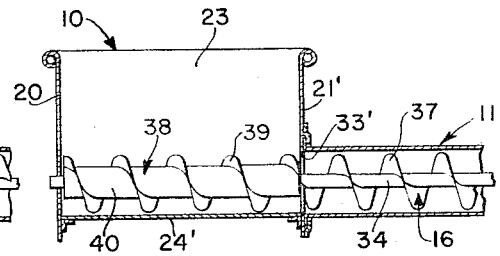
FIG. 3 is a view similar to FIG. 2 but showing a modified form of the invention.

In the form of the invention shown in FIG. 3, the wall 21' has a discharge opening 33' slightly greater than the diameter of the flighting 37 in the auger 16. An auger extension 38 provided in the base of the hopper 10 has auger flighting 39 with the same outside diameter dimension as the flighting 37. The core 34 of the auger 16 is axially coextensive with a core 40 of the auger extension 38. However, from viewing FIG. 3, it becomes clearly apparent that the core 40 is considerably larger than the core 34 and as a result the capacity of the helical or auger flighting 39 to move material is considerably less than that of the flighting 37. Consequently the material moved from the hopper 10 through the opening 33' in the wall 21' and into the auger housing 12 will be at a reduced rate or capacity as compared to the capability of the auger 16 to move material. In the modification shown in FIG. 3, the hopper floor 24' is slightly lower than in the previous form to accommodate the larger auger 38.

Figure 4:
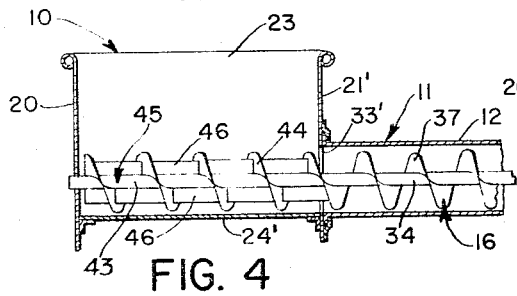
FIG. 4 is a view similar to FIG. 2 but showing still a further modified form of the invention.

In the form of the invention shown in FIG. 4, the hopper 10 and auger 11 are substantially identical to that of the previous form and consequently the same reference numbers are given to identical structure. In this form of the invention, the core 43 of the auger extension 45 contained within the hopper 10 is axially coextensive and substantially the same size as the core 34 of the main auger 16. Likewise the flighting 44 of the auger extension 45 is substantially identical to the flighting 37 and is a general continuance of that flighting. The auger extension 45 is different than the main auger 16 in the provision of panel structure 46 that extends between the faces of the flighting 44. As may be seen from viewing FIG. 4, each panel 46 traverses longitudinally the spacing between turns of flighting.

In the modification shown in FIG. 4, the capacity of the extension 45 is considerably smaller than that of the main auger 16 due to the fact that the panels 46 will generally maintain the area between the flighting sufficiently clear so as to prevent a large buildup of material between the flights of the flighting 44. Consequently as the material moves through the opening 33', the auger 37 will only be partially filled and material will not be above the level of the lower edge of the slot 30 while within the inner auger housing 12.

Figure 5:
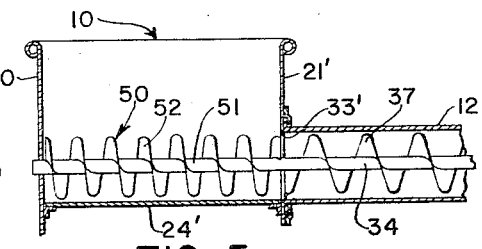
FIG. 5 is a view similar to FIG. 2 but showing still a further modified form of the invention.

In the form of the invention shown in FIG. 5, the auger extension 50 within the hopper 10 has a central core 51 identical to and axially continuous with the core 34 of the main auger 16. Flighting 52 on the core 51 has substantially the same diameter as the flighting 37 but has a pitch substantially equal to one-half that of the flighting 37. Consequently as the cores 51, 34 rotate, material moved axially by the flighting 52 will move at a rate substantially equal to one-half the rate of axial movement by the flighting 37. Thus, as the material moves through the opening 33', the capacity of the auger 16 will be only half or partially used. For this reason, material moving into the first or inner housing 12 will fill the auger housing 12 substantially to the height of the lower edge of the slot 30.

Figure 7:
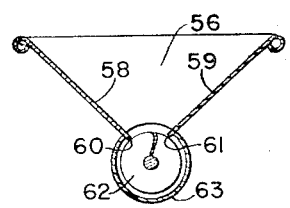
FIG. 7 is a sectional view taken substantially along the line 7—7 of FIG. 6.
Figure 6:
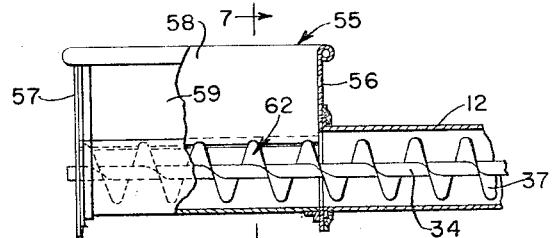
FIG. 6 is a view similar to FIG. 2 but showing still a further modified form of the invention.

In the form of the invention shown in FIGS. 6 and 7, a hopper structure 55 is provided that includes end walls 56, 57 and inclined side walls 58, 59 that converge downwardly to lower edges 60, 61 disposed above an auger extension 62. The auger 62 is disposed in an auger housing 63, also a part of the hopper 55. The auger housing 63 is a substantial extension or continuation of the auger housing 12 and encloses the auger 62 from the sides and bottom leaving an open upper side as defined by the edges 60, 61 to receive material from the hopper 55. The housing extension 63 is formed about the axis of the auger 62. The auger extension 62 extends the full length of the hopper 55 and is in fact a continuation of the main auger 16. In operation material is moved into the hopper 55. However, due to the relatively narrow slot, as defined by the edges 60, 61, the auger housing extension 63 is not filled to capacity with material. Consequently as the material moves from the hopper 55 into the first or inner auger housing 12, the latter will not be filled with material to an extent that it will pass over the lower edge of the slot in greater amounts.

While several forms of the invention have been shown, it should be recognized that other forms and variations thereof may occur to those skilled in the art. Therefore while the preferred forms have been shown and described in concise and detailed manner for the purpose of clearly and concisely illustrating the principles of the invention, it should be understood that there is no intention to limit or narrow the invention beyond the broad concept set forth in the appended claims.

What is claimed is:

1. A bunk feeder comprising: an elongated, substantially horizontal auger housing having a material intake end and elongated side discharge opening means extending substantially the full length of the housing; a material hopper at the intake end of the auger housing with a wall extending upwardly at the end and having a material opening aligned with the end of the auger housing for permitting passage of material from the hopper into the auger housing; and continuous auger means extending through the opening and having a first part in and extending lengthwise of the base of the hopper to a second part retained in the auger housing for delivering material lengthwise of the housing and for discharging material through the side discharge means in substantially even quantities lengthwise of the housing, with said first part having a material capacity substantially less than the material capacity of the second part and the capacity of said first part being such that the material will be substantially at the level of the elongated side discharge opening means to thereby automatically reduce the level of material in the auger housing to substantially the height of the opening means adjacent the intake end of the auger housing.

2. The invention defined in claim 1 in which the second part and first part are axially coextensive and the first part has its spiral flighting of smaller diameter than the flighting of the second part.

References Cited by the Examiner

UNITED STATES PATENTS

| | | | |
|---|---|---|---|
| 958,965 | 5/1910 | May | 198—214 |
| 1,468,379 | 6/1920 | Easton | 198—213 X |
| 2,279,640 | 5/1942 | Ringmarch | 226—48 |
| 2,531,928 | 2/1947 | Webb | 198—64 |
| 2,569,039 | 9/1951 | Berthelot | 198—64 |
| 2,778,482 | 1/1957 | Lash et al. | 198—213 |
| 3,105,586 | 10/1963 | Carew et al. | 198—64 |
| 3,176,832 | 4/1965 | Wilkes | 198—64 |
| 3,231,071 | 1/1966 | Prentice | 198—204 |

EVON C. BLUNK, *Primary Examiner.*

M. L. AJEMAN, *Assistant Examiner.*